United States Patent
Lee et al.

(10) Patent No.: US 12,176,555 B2
(45) Date of Patent: Dec. 24, 2024

(54) BATTERY MODULE

(71) Applicant: SAMSUNG SDI CO., LTD., Yongin-si (KR)

(72) Inventors: Hoo Min Lee, Yongin-si (KR); Seon Ung Choi, Yongin-si (KR); Jae lim Ryu, Yongin-si (KR); Jong hyun Lee, Yongin-si (KR); Han Ho Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 371 days.

(21) Appl. No.: 17/209,533

(22) Filed: Mar. 23, 2021

(65) Prior Publication Data

US 2021/0320358 A1    Oct. 14, 2021

(30) Foreign Application Priority Data

Apr. 10, 2020    (KR) .................. 10-2020-0044203

(51) Int. Cl.
| | |
|---|---|
| *H01M 50/204* | (2021.01) |
| *H01M 50/107* | (2021.01) |
| *H01M 50/289* | (2021.01) |
| H01M 10/04 | (2006.01) |
| H01M 50/209 | (2021.01) |
| H01M 50/291 | (2021.01) |

(52) U.S. Cl.
CPC ....... *H01M 50/204* (2021.01); *H01M 50/107* (2021.01); *H01M 50/289* (2021.01); *H01M 10/0481* (2013.01); *H01M 50/209* (2021.01); *H01M 50/291* (2021.01); *Y02E 60/10* (2013.01)

(58) Field of Classification Search
CPC .......... H01M 10/0481; H01M 50/204; H01M 50/289; H01M 50/209; H01M 50/107; H01M 50/291; Y02E 60/10
USPC .......................................... 429/99
See application file for complete search history.

(56) References Cited

U.S. PATENT DOCUMENTS

| | | | |
|---|---|---|---|
| 8,765,287 | B2 | 7/2014 | Kim |
| 9,028,996 | B2 | 5/2015 | Yoshioka et al. |
| 9,780,421 | B2 | 10/2017 | Palanchon et al. |
| 10,230,082 | B2 | 3/2019 | Choi et al. |
| 10,249,864 | B2 | 4/2019 | Yamanaka |
| 10,347,881 | B2 | 7/2019 | Han |
| 10,522,804 | B2 | 12/2019 | Lee |
| 2007/0285051 | A1 | 12/2007 | Jeon et al. |

(Continued)

FOREIGN PATENT DOCUMENTS

| | | |
|---|---|---|
| CN | 102931447 A | 2/2013 |
| CN | 103098295 A | 5/2013 |

(Continued)

OTHER PUBLICATIONS

Chinese Office action dated Nov. 2, 2022.

*Primary Examiner* — Jonathan G Jelsma
*Assistant Examiner* — Omar M Kekia
(74) *Attorney, Agent, or Firm* — Lee IP Law, P.C.

(57) ABSTRACT

A battery module including a plurality of battery cells; and a spacer between the battery cells, the spacer including a support frame, and at least one pressing member coupled to the support frame, the at least one pressing member including a plate surface facing one of the battery cells and being in contact with an outside of a can of the one battery cell.

7 Claims, 8 Drawing Sheets

(56) References Cited

U.S. PATENT DOCUMENTS

| | | | | |
|---|---|---|---|---|
| 2013/0095359 | A1* | 4/2013 | Yoshioka | H01M 50/209 |
| | | | | 429/99 |
| 2015/0303425 | A1* | 10/2015 | Kong | H01M 50/411 |
| | | | | 429/152 |
| 2017/0200934 | A1* | 7/2017 | Yamanaka | H01M 10/0481 |
| 2020/0099034 | A1* | 3/2020 | Jin | H01R 13/512 |
| 2021/0194048 | A1* | 6/2021 | Taniuchi | H01M 10/0562 |
| 2022/0140428 | A1* | 5/2022 | Chi | H01M 50/271 |
| | | | | 429/99 |

FOREIGN PATENT DOCUMENTS

| | | | |
|---|---|---|---|
| CN | 106463669 | A | 2/2017 |
| CN | 107887538 | A | 4/2018 |
| JP | 2003142052 | A | 5/2003 |
| JP | 2005108693 | A | 4/2005 |
| JP | 2005197179 | A | 7/2005 |
| JP | 2007294407 | A | 11/2007 |
| JP | 2014170697 | A | 9/2014 |
| KR | 10-2013-0035244 | A | 4/2013 |
| KR | 10-2016-0123814 | A | 10/2016 |
| KR | 10-1894652 | B | 8/2018 |

\* cited by examiner

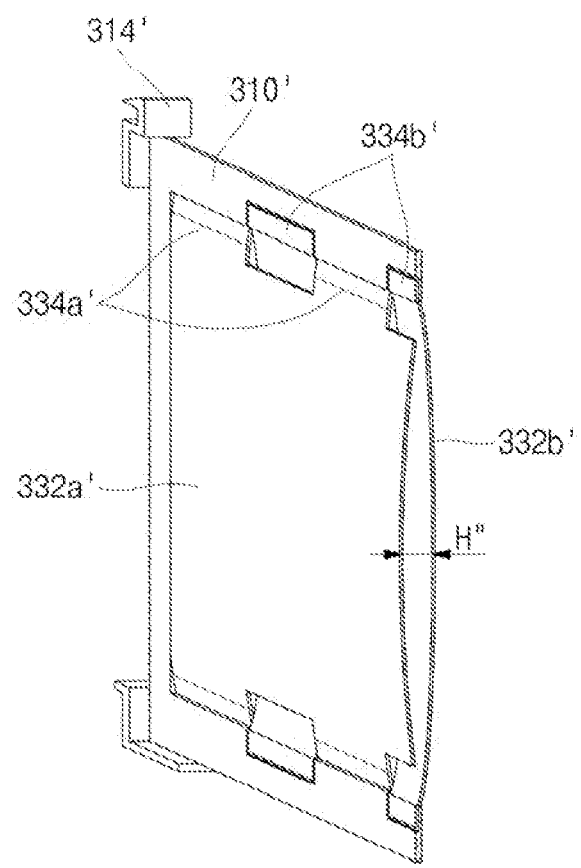

BATTERY MODULE

CROSS-REFERENCE TO RELATED APPLICATION

Korean Patent Application No. 10-2020-0044203 filed on Apr. 10, 2020, in the Korean Intellectual Property Office, and entitled: "Battery Module," is incorporated by reference herein in its entirety.

BACKGROUND

1. Field

Embodiments relate to a battery module.

2. Description of the Related Art

Generally, a secondary battery is a chargeable and dischargeable battery, unlike a primary battery that is not chargeable. Secondary batteries may be used as energy sources for a mobile device, an electric vehicle, a hybrid vehicle, an electric bicycle, an uninterruptible power supply, or the like. Such a secondary battery may be used in the form of a single battery depending on the types of external devices to be applied or in the form of a battery module in which a plurality of battery cells are electrically connected to each other to form a single unit.

The above information disclosed in this Background Art is only for enhancement of understanding of the background of the described technology, and therefore it may contain information that does not form the related art.

SUMMARY

The embodiments may be realized by providing a battery module including a plurality of battery cells; and a spacer between the plurality of battery cells, the spacer including a support frame, and at least one pressing member coupled to the support frame, the at least one pressing member including a plate surface facing one of the battery cells and being in contact with an outside of a can of the one of the battery cells.

The at least one pressing member may include a plurality of leaf springs.

Each leaf spring of the plurality of leaf springs may include a bump having a shape that is convex in one direction, and a pair of extension parts respectively extending from opposite ends of the bump and coupled to the support frame.

Each leaf spring of the plurality of leaf springs may be arranged such that a convex direction of one bump is opposite to a convex direction of an adjacent bump.

The support frame may include an insertion part extending inwardly from a long side corresponding to a direction of a long side of the plurality of battery cells and having an insertion groove into which the pair of extension parts are insertable.

The insertion groove may have a width that is greater than a thickness of the pair of extension parts.

A width of each leaf spring of the plurality of leaf springs in a direction of a long side of the plurality of battery cells may be about 7% to about 10% of a length of the long side of the plurality of battery cells.

A height of each bump may be about 7% to 10% of a length of a short side of the plurality of battery cells.

The at least one pressing member may include a pair of leaf springs facing each other.

The pair of leaf springs may include a first leaf spring including a first bump having a shape that is convex in one direction and a plurality of first extension parts respectively extending from opposite ends of the first bump and coupled to the support frame; and a second leaf spring including a second bump having a shape that is convex in another direction and a plurality of second extension parts respectively extending from opposite ends of the second bump and coupled to the support frame.

The first leaf spring and the second leaf spring may be disposed so that a convex protruding direction of the first bump is opposite to a convex protruding direction of the second bump.

The first leaf spring and the second leaf spring may be disposed so that the plurality of first extension parts and the plurality of second extension parts are alternated with respect to each other, with the support frame therebetween.

An interval between the first bump and the second bump may be about 10% of a length of a short side of the plurality of battery cells.

BRIEF DESCRIPTION OF THE DRAWINGS

Features will be apparent to those of skill in the art by describing in detail exemplary embodiments with reference to the attached drawings in which:

FIG. 8 is a partial perspective view of the spacer, taken along line B-B of FIG. 6.

DETAILED DESCRIPTION

Figure 1:
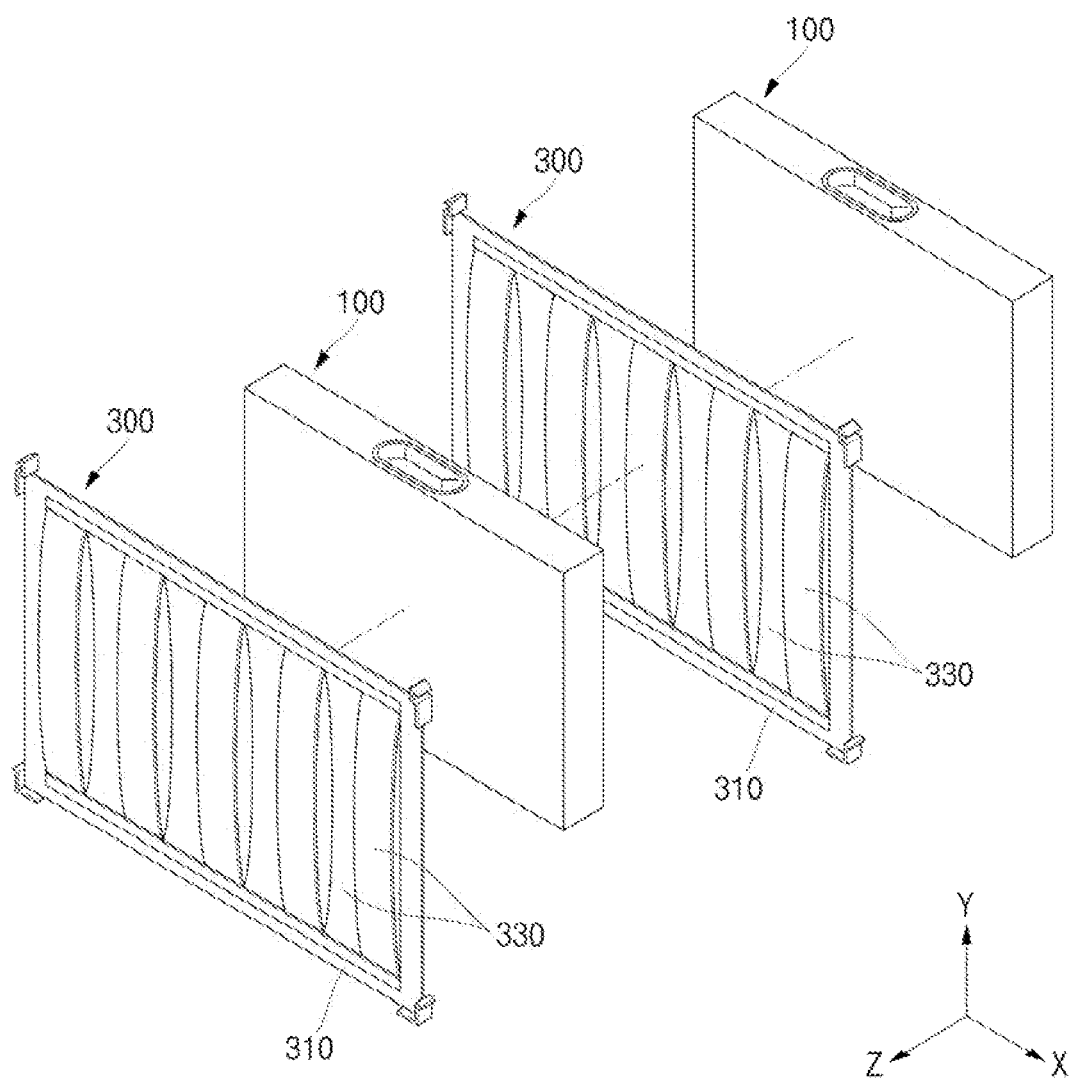
FIG. 1 is an exploded perspective view of a main configuration of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used in this specification, the terms "or" and "and/or" include any and all combinations of one or more of the associated listed items. In this specification, it will also be understood that when a member A is referred to as being connected to a member B, the member A can be directly connected to the member B or indirectly connected to the member B with a member B therebetween.

The terms used herein are for illustrative purposes only and should not be construed to limit the meaning or the scope of the present application. As used in this specification, a singular form may, unless definitely indicating a particular case in terms of the context, include a plural form. Also, the expressions "comprise/include" and/or "comprising/including" used in this specification neither define the mentioned shapes, numbers, steps, operations, members, elements, and/or groups of these, nor exclude the presence or addition of one or more other different shapes, numbers, steps, operations, members, elements, and/or groups of these, or addition of these.

As used in this specification, terms such as "first," "second," etc. are used to describe various members, components, regions, layers, and/or portions, and do not imply or require sequential inclusion. The members, components, regions, layers, and/or portions should not be defined by these terms. The terms do not mean a particular order, up and down, or superiority, and are used only for distinguishing one member, component, region, layer, or portion from another member, component, region, layer, or portion. Thus, a first member, component, region, layer, or portion which will be described may also refer to a second member, component, region, layer, or portion, without departing from the teaching herein.

Spatially relative terms, such as "below", "beneath", "lower", "above", "upper" and the like, may be used herein for ease of description to describe one element or feature's relationship to another element(s) or feature(s) as illustrated in the figures. These spatially relative terms are intended for easy comprehension according to various process states or usage states, and thus, the present application is not limited thereto. For example, an element or feature shown in the drawings is turned inside out, the element or feature described as "beneath" or "below" may change into "above" or "upper". Thus, the term "below" may encompass the term "above" or "below".

First, a battery module according to an embodiment will be briefly described.

Figure 2:
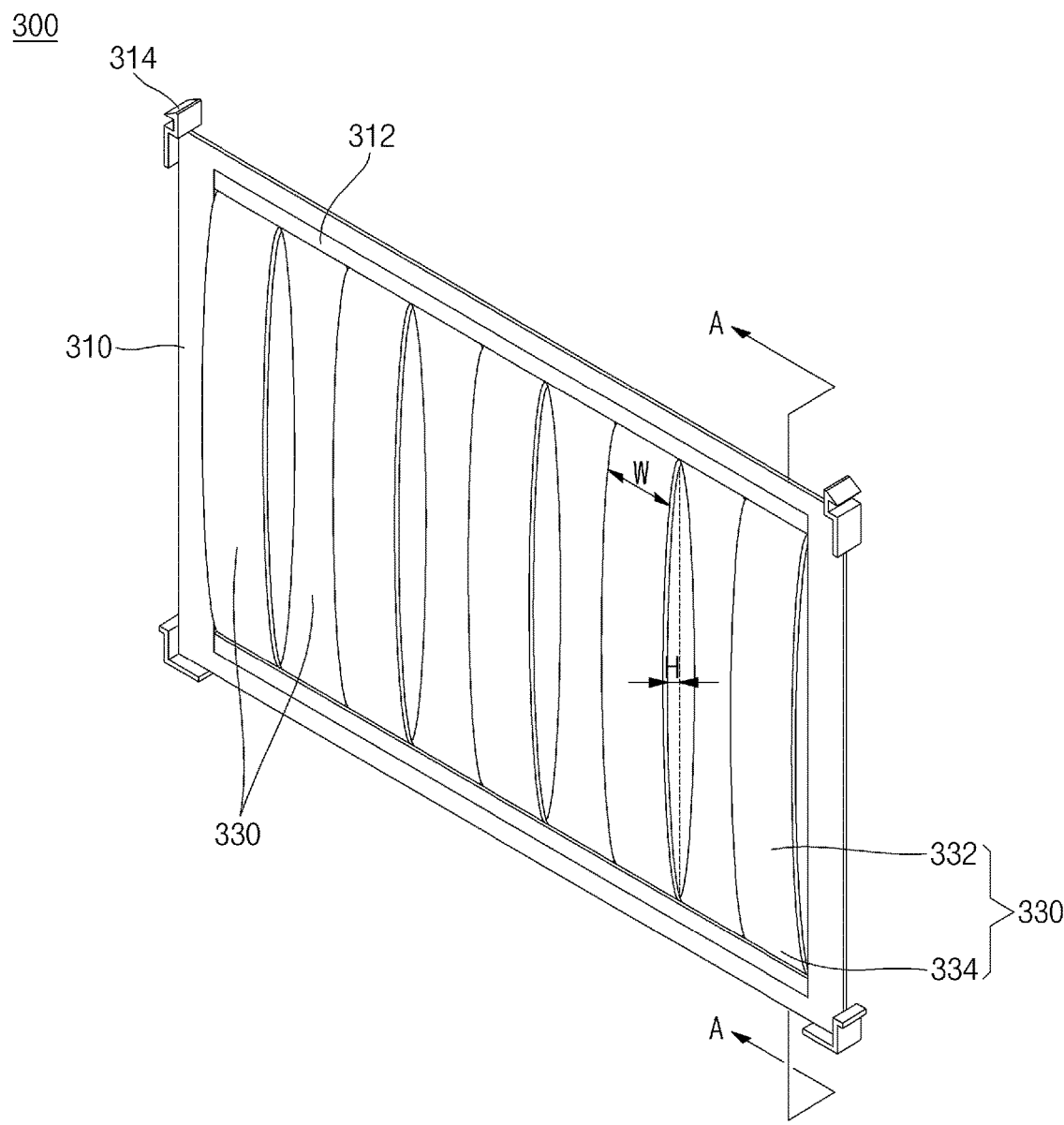
FIG. 2 is an enlarged perspective view of a spacer of the battery module of FIG. 1 according to the embodiment.
Figure 3:
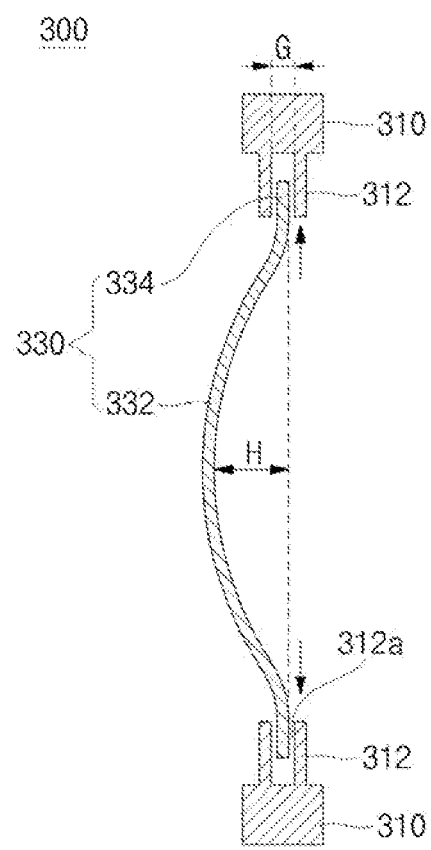
FIG. 3 is a cross-sectional view of a state before a spacer supports a load, taken along line A-A of FIG. 2.
Figure 4:
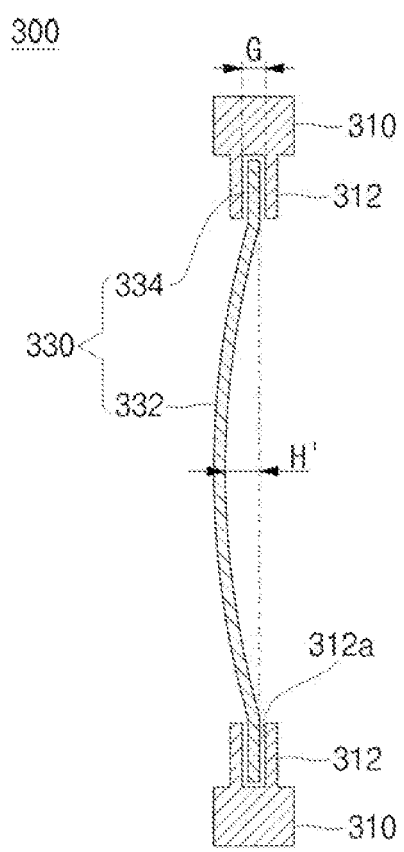
FIG. 4 is a cross-sectional view of a state after the spacer supports a load, taken along line A-A of FIG. 2.

FIG. 1 is an exploded perspective view of a main configuration of a battery module according to an embodiment, FIG. 2 is an enlarged perspective view of a spacer of the battery module of FIG. 1 according to the embodiment, FIG. 3 is a cross-sectional view of a state before a spacer supports a load, taken along line A-A of FIG. 2, and FIG. 4 is a cross-sectional view of a state after the spacer supports a load, taken along line A-A of FIG. 2 (hereinafter, front and rear sides are defined with respect to a Z-axis direction of FIG. 1, wherein a surface facing the front side is defined as a front surface of a battery cells 100, and a surface (not shown in FIG. 1) facing the rear side is defined as a rear surface of the battery cell 100).

As illustrated in FIG. 1, a battery module according to an embodiment may be configured so that a plurality of battery cells 100 are disposed in or aligned along one direction (e.g., a Z-axis or Z direction), and a plurality of spacers 300 are respectively between the battery cells 100. In an implementation, the battery cells 100 may be disposed along the Z direction of FIG. 1.

Each of the plurality of spacers 300 may have the same structure and the same size, and may be between the battery cells 100, and an interval between the battery cells 100 may be uniformly maintained by the spacers 300.

As illustrated in FIGS. 1 and 2, each of the spacers 300 may include a support frame 310 and a plurality of elastic or pressing members 330 coupled to the support frame 310.

The support frame 310 may be a rectangular frame corresponding to a shape of each of the battery cells 100. In an implementation, the support frame 310 may include a pair of long sides corresponding to long sides of the battery cell 100 and a pair of short sides corresponding to short sides of the battery cell 100. In an implementation, the support frame 310 may have a rectangular shape. An insertion part 312, into which each of the pressing members 330 is inserted, may be inside (e.g., on an inner side of) each of the long sides of the support frame 310. A hook 314 connected to a bracket coupled to the battery cell 100 may be at each of outer corners of the support frame 310. In an implementation, the hook 314 may be omitted depending on a structure of the bracket.

As illustrated in FIG. 3, the insertion part 312 may extend inwardly from the long side of the support frame 310 toward the inside thereof (e.g., in the Y direction of FIG. 1), and an insertion groove 312a may be defined along a longitudinal direction of the long side (e.g., the insertion groove 312a may extend lengthwise in the X direction). The insertion groove 312a may have a predetermined width G (e.g., in the Z direction), and an end of the pressing member 330 may be inserted into and supported by the insertion groove 312a. The width G of the insertion groove 312a may be greater than a thickness of the pressing member 330 (as will be described below). In an implementation, the width G of the insertion groove 312a may be, e.g., about 2 mm to about 3 mm.

As illustrated in FIGS. 1 and 2, the pressing member 330 may be a kind of leaf spring, and the plurality of pressing members 330 may be inserted into the insertion parts 312. The pressing member 330 may have a thickness of approximately 0.3 mm so as to be prevented from being bent in other directions except for a cell swelling direction while absorbing cell swelling maximally. In an implementation, the thickness of the pressing member 330 may vary depending on models of the battery cells 100. As illustrated in FIG. 3, the pressing member 330 may include a bump 332 having a shape that is convex in one direction (e.g., the Z direction) and a pair of extension parts 334 extending from the bump 332 (e.g., in the Y direction).

In an implementation, referring to FIG. 2, a width W of the pressing member 330 (e.g., in the X direction) may be about 7% to about 10% of a total length of the long edge of the battery cell 100 (e.g., in the X direction), and a height H of the bump 332 (e.g., in the Z direction) may be about 7 to about 10% of a length of the short edge of the battery cell 100 (e.g., in the Z direction). Maintaining the width of the pressing member 330 at about 10% or less may facilitate uniformly pressing both side cells. Maintaining the width of the pressing member 330 at about 7% or greater may help prevent the pressing member 330 from being bent in a direction except for the cell swelling direction, and may help prevent deterioration of assembleability.

The bump 332 may have a shape that is convex in one direction (e.g., the Z direction). In an implementation, a plurality of the pressing members 330 may be provided, and adjacent pressing members 330 may be disposed so that the convex directions of the bumps 332 are opposite to each other (e.g., alternating). In an implementation, the battery module may include ten pressing members 330 coupled to the support frame 310, odd-numbered pressing members 330 may be disposed so that the convex directions of the bumps 332 face or extend toward the front side (e.g., in the Z direction), and even-numbered pressing members 330 may be disposed so that the convex directions of the bumps 332 face or extend toward the rear side (e.g., in the Z direction). The facing directions of the bumps 332 may be alternately disposed because the spacers 300 may be inserted between the battery cells 100, and the pressing members 330 may press all the battery cells 100 in front and rear directions of the spacers 300.

In an implementation, the height H of the bump 332 may be about 10% of the length of the short side of the battery cell 100 (e.g., in the Z direction), which may be defined as a deformable displacement of the bump 332. In an implementation, a proper pressure required at the beginning of use of the battery module may be provided by designing the bumps 332 so that the height of the bump 332 is greater than the interval between battery cells 100 to help secure stability of the battery module if external vibration or impact were to be transmitted to the battery module. In an implementation, the height H of the bump 332 may be a distance (e.g., in the Z direction) from an apex of the bump 332 to a plane of the extension parts 334 (e.g., an X-Y plane).

In an implementation, the interval between the battery cells 100 (in consideration of swelled battery cell 100 when the battery cell 100 is swelled) may be about 2 mm. In this case, the height H of the bump 332 may be set to about 2.5 mm to about 3 mm, e.g., greater than the interval between the battery cells 100. If the height H of the bump 332 is greater than the spaced interval between the battery cells 100, the battery cells 100 may be pressed so that the battery cells 100 do not move while the bump 332 is pressed in contact with the battery cells 100. Accordingly, the movement of the battery cell 100 may be reduced or prevented by giving initial pressing force to the battery cell 100 while the interval between the battery cells 100 is maintained so as not to be narrowed, thereby improving the stability of the battery module. In an implementation, the pressing member 330 may be included, and an initial pressing force of about 5 kN (pressing force of about 500 kg) may be provided.

Generally, after applying predetermined pressing force to the battery cell through coupling and pressing equipment, reduction in a state of health (SOH) may be measured by measuring a charge capacity of the battery at each cycle while a battery charging/discharging cycle test is performed, and thus, deterioration of the lifespan of the cell according to the pressing force may be measured. As an example of this experiment, under a pressure condition in which the pressure applied to the battery cell 100 is about 0.7 MPa, the battery cell 100 may be normally deteriorated and maintained in its expected lifespan. However, if the pressure applied to the battery cell 100 were to be about 1.3 MPa to about 2 MPa, deterioration of the battery cell 100 may be accelerated, and if the pressure applied to the battery cell 100 were to be about 4.6 MPa or more, the battery cell 100 may be rapidly deteriorated. Therefore, it is better than the pressure applied to the battery cell 100 is more uniform and lower. However, if the pressure applied to the battery cell 100 were to be too low, the battery cell 100 may move, causing deformation of surrounding components such as a busbar and the like, thereby damaging the battery cell 100. Accordingly, a pressure that does not have an adverse influence on the lifespan of the battery cell 100 without the movement of the battery cell 100 by applying the proper pressure may be selected.

In another type of battery module, a spacer may include a groove and a protrusion, and a can of the battery cell could be locally pressed or stabbed. Accordingly, there is a high possibility of accelerated or rapid deterioration of battery cells.

In an implementation, in the spacer 300 according to an embodiment, the height H of the bump of the pressing member 330 may be greater than the interval between the battery cells 100, and a wide area of the spacer 300 may be pressed to be in surface-contact with the front or rear surface of adjacent battery cells 100 when the spacer 300 is in contact with the adjacent battery cells 100. Accordingly, a uniform pressure distribution may be applied to an electrode plate of the battery cell 100, the battery cell 100 may not be rapidly deteriorated, and the lifespans of the battery cells 100 in the battery module may be constantly maintained.

As illustrated in FIGS. 3 and 4, the extension parts 334 may extend from each of an upper end and a lower end of the bump 332 (e.g., in the Y direction), and one pressing member 330 may include a pair of extension parts 334. Each of the extension parts 334 may extend from the bump 332 so as to be parallel to the insertion part 312 if being inserted into the insertion part 312. Referring to FIG. 3, the extension part 334 on the upper end may be inserted into the upper insertion part 312 of the support frame 310, and the extension part 334 on the lower end may be inserted into the lower insertion part 312 of the support frame 310.

Before being in contact with (e.g., pressing against) the battery cell 100, the bump 332 may be in a state without the deformation or undeformed state (e.g., the height H of the bump), and the extension part 334 may be in a state in which the extension part 334 is not completely pushed and inserted into an inner end (e.g., bottom) of the insertion groove 312a. When the bump 332 is in contact with (e.g., pressing against) the battery cell 100, the bump 332 may be pressed and deformed (e.g., the height of the bump decreases to a height H'), and thus, the extension part 334 may be pushed along a longitudinal direction of the pressing member 330, which is a vertical direction of FIG. 3 (e.g., a Y direction). In an implementation, as illustrated in FIG. 4, the extension part 334 may be further or completely pushed and inserted into the inner end (e.g., bottom) of the insertion groove 312a to help disperse a load in the longitudinal direction of the pressing member 330.

In addition, the thickness of the pressing member 330 may be less than the width G of the insertion groove 312a in the insertion part 312, and the extension part 334 may move in a direction of the width G of the insertion groove 312a (in a direction of an arrow at a portion G of FIG. 4, or a Z direction) in the state of being inserted into the insertion groove 312a. If the bump 332 is pressed by the front surface or rear surface of the battery cell 100 and is deformed, a space, in which the extension part 334 is movable, may be defined, which is advantageous for absorption of the load.

A load absorbing capacity of the spacer 300 according to the structure of the pressing member 330 may be excellent as compared with the structure of a Comparative example as follows.

Figure 5:
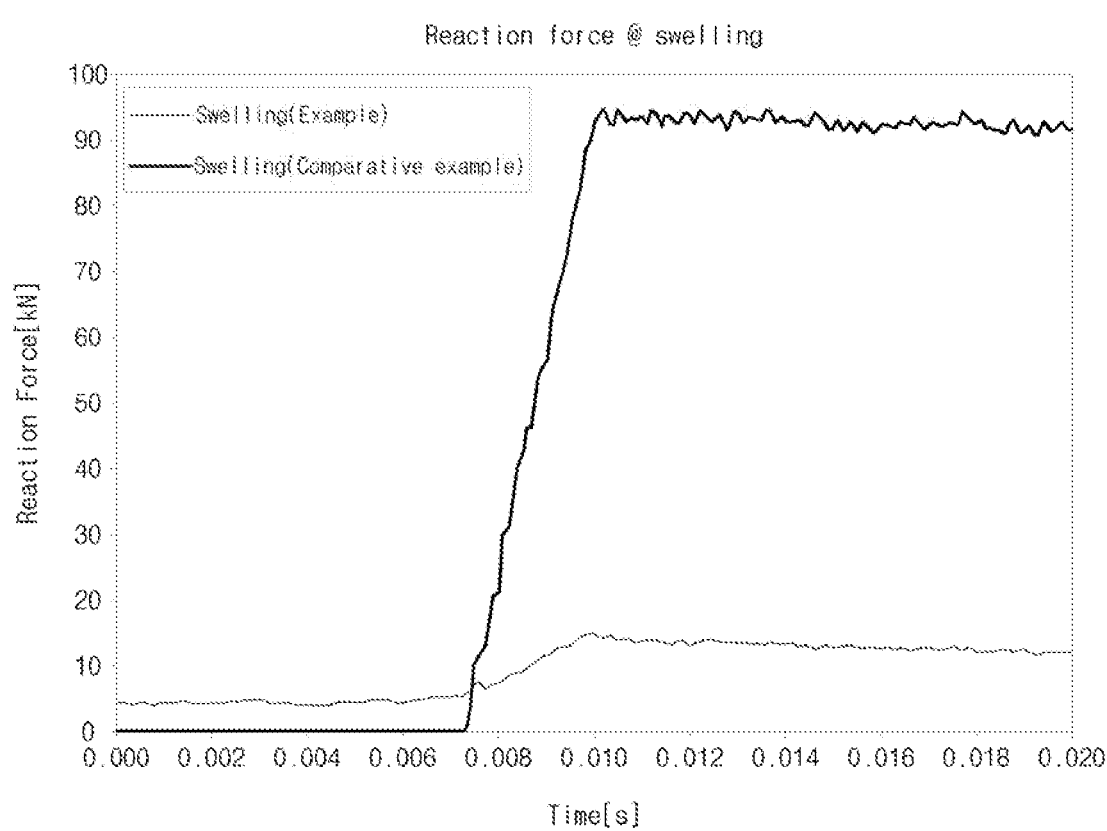
FIG. 5 is a graph showing results obtained by comparing swelling load absorbing capacities of spacers according to an Example and a Comparative example.

FIG. 5 is a graph of results obtained by comparing swelling load absorbing capacities of the spacers according to an Example and a Comparative example.

As illustrated in FIG. 5, the spacer according to the Comparative example did not effectively absorb a load when swelling occurred, resulting in high repulsive force of about 92 kN. However, the spacer according to the Example effectively absorbed a load when swelling occurred, resulting in repulsive force of about 11 kN. It may be seen that the load absorbing capacity of the spacer structure according to the Example improved by about 90%, as compared with the Comparative example (the repulsive force was analyzed using a commercial finite element analysis tool, and the repulsive force was measured by reproducing the swelling condition of the cell).

A spacer having similar effects may be provided by modifying the structure of the pressing member of the foregoing embodiment. Hereinafter, a spacer according to another embodiment will be described.

Figure 6:
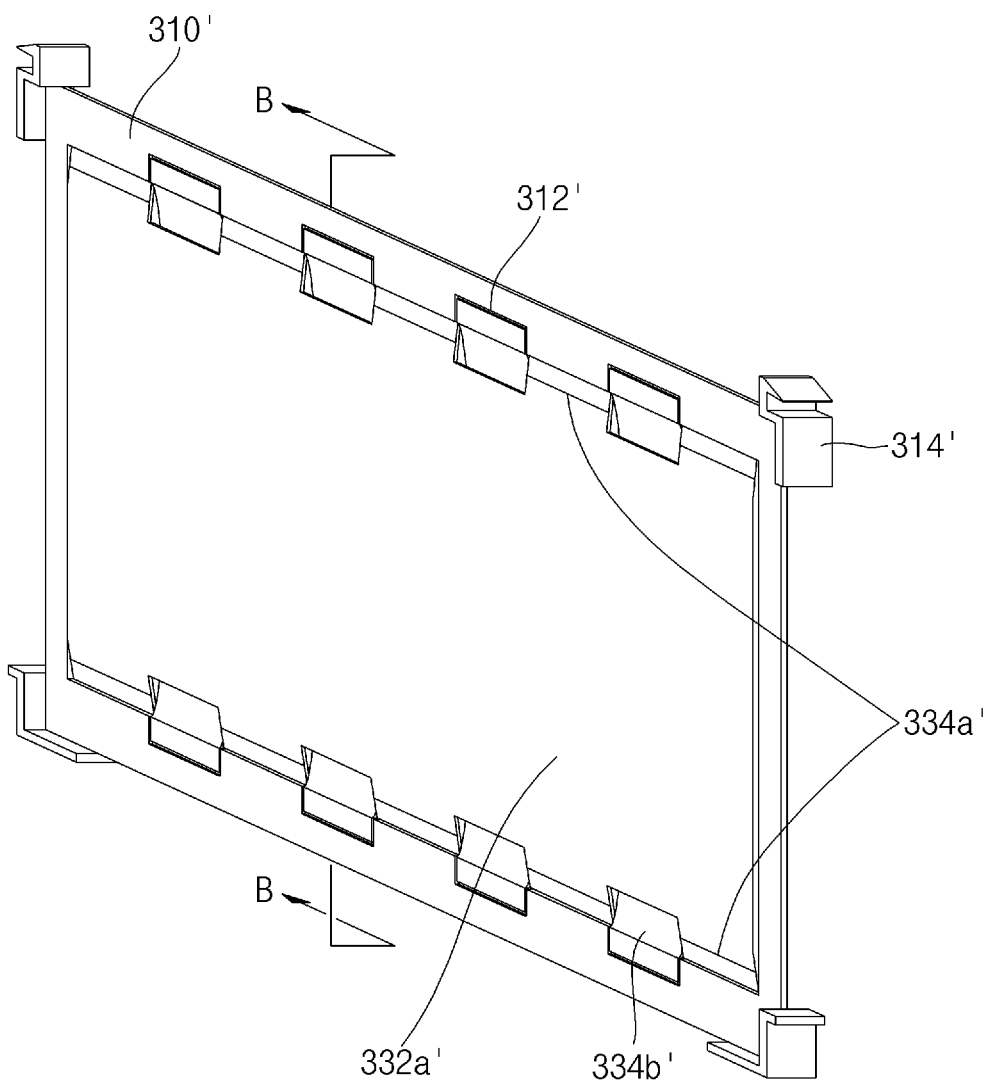
FIG. 6 is an enlarged perspective view of a spacer of a battery module according to another embodiment.
Figure 7:
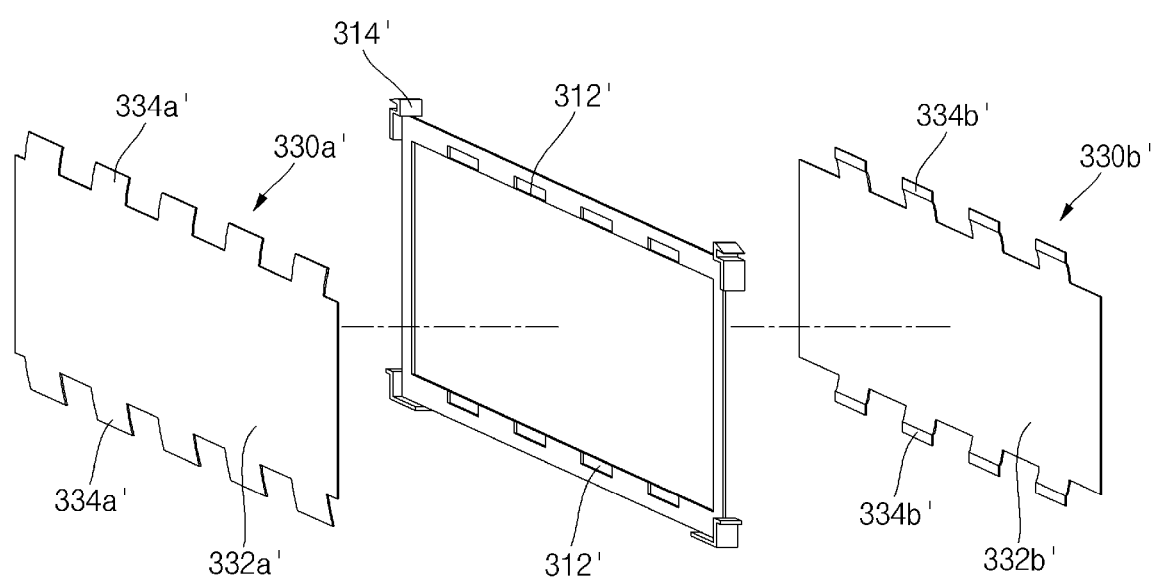
FIG. 7 is an exploded perspective view of the spacer of FIG. 6.

FIG. 6 is an enlarged perspective view of a spacer of a battery module according to another embodiment. FIG. 7 is an exploded perspective view of the spacer of FIG. 6. FIG. 8 is a partial perspective view of the spacer, taken along line B-B of FIG. 6 (the battery cells are the same as that of FIG. 2 according to the foregoing embodiment, and a description will be made by using the same reference numerals).

As illustrated in FIGS. 6 to 8, a spacer 300' according to the present embodiment may include a support frame 310' and a pair of pressing members 330a' and 330b'.

As illustrated in FIGS. 6 and 7, the support frame 310' may be a rectangular frame corresponding to a shape of a battery cell 100. In an implementation, the support frame 310' may include a pair of long sides corresponding to long sides of the battery cell 100 and a pair of short sides corresponding to short sides of the battery cell 100. In an implementation, the support frame 310' may have a rectangular shape. A plurality of seating grooves 312', on which the pressing members 330a' and 330b' are seated, may be provided on front and rear surfaces of the long sides of the support frame 310' (see FIG. 7). A hook 314' may be at each of outer corners of the support frame 310'.

As illustrated in FIG. 7, the seating grooves 312' may be concavely defined in plate surfaces of the long sides and may be provided in plurality in the front and rear surfaces thereof. The seating grooves 312' may be defined at positions corresponding to those of extension parts 334a' and 334b' of the pressing members 330a' and 330b', which will be described below. The seating grooves 312' may help prevent the pressing members 330a' and 330b' from protruding from the support frame 310' to be thickened by a thickness of each of the pressing members 330a, 330b' if the pressing members 330a' and 330b' were to be coupled to the support frame 310'. Accordingly, the seating grooves 312' may be defined in correspondence to the thicknesses of each of the pressing members 330a' and 330 b' (a thicknesses of each of the extension parts which will be described below).

As illustrated in FIGS. 6 and 7, the pressing members 330a' and 330b' may be coupled to the support frame 310' in a shape in which two sheets of leaf springs overlap each other. The pressing members 330a' and 330b' include a first pressing member 330a' disposed in a left direction (a front side for convenience) and a second pressing members 330b' disposed in a right direction (a rear side for convenience) with reference to FIG. 7. In a state in which the support frame 310' is between the first pressing member 330a' and the second pressing member 330b', the extension parts 334a' and 334b' on the first pressing members 330a' and the second pressing members 330b' may be alternated with respect to each other (e.g., along the X direction) as if fingers were interlocked and then are coupled to the support frame 310'.

As illustrated in FIG. 7, the first pressing member 330a' may include a first bump 332a' (e.g., a leaf spring) and a plurality of first extension parts 334a' at a predetermined interval on long sides of upper and lower sides of the first bump 332a'. The first bump 332a' may have a shape that is convex forward as illustrated in FIG. 8.

The second pressing member 330b' may include a second bump 332b' (e.g., a leaf spring) and a plurality of second extension parts 334b' at a predetermined interval on long sides of upper and lower sides of the second bump 332b'. The second bump 332b' has a shape that is convex backward as illustrated in FIG. 8.

In an implementation, the first bump 332a' and the second bump 332b' may face each other, and the first extension part 334a' and the second extension part 334b' may be alternated with respect to each other. In an implementation, the first pressing member 330a' may be coupled to the support frame 310', and the first extension part 334a' may be seated in the seating groove 312' in a rear surface of the support frame 310'. In an implementation, the second pressing member 330b' may be seated in the seating groove 312' in the front surface of the support frame 310'. In an implementation, the first extension part 334a' and the second extension part 334b' may be alternated with respect to each other and also are coupled to be alternated with respect to each other even when being coupled to the support frame 310'. Accordingly, the seating groove 312' in the front surface of the support frame 310' may be defined in correspondence to the position of the second extension part 334b', and the seating groove 312' in the rear surface of the support frame 310' is defined in correspondence to the position of the first extension part 334a'.

In an implementation, the first extension part 334a' and the second extension part 334b' may be attached to the support frame 310' using a tape or the like in a state in which the first extension part 334a' and the second extension part 334b' are seated in the seating grooves 312'.

The first bump 332a' and the second bump 332b' may have shapes that are convex in opposite (e.g., outward) directions, an interval H" may be between the first bump 332a' and the second bump 332b' (e.g., between an apex of the first bump 332a' and an apex of the second bump 332b'). The interval H" may be a sum of a height of the first bump 332a' and a height of the second bump 332b'. The interval H" may be defined as a deformable displacement of each of the first bump 332a' and the second bump 332b', and the interval H" may be about 10% of a length of the short side of the battery cell 100.

In an implementation, the first bump 332a' and the second bump 332b' may be (e.g., outwardly) convex in opposite directions, the spacer 300' may be between the plurality of battery cells 100, like the foregoing embodiment of FIG. 1, and the battery cells 100 respectively at front and rear sides of the spacer 300' may be pressed. Accordingly, the same effects as those of the embodiments of FIGS. 1 to 4 may be realized.

According to the embodiments, the structure of the spacer may be improved to help provide an initial pressing force for the battery module while being uniformly maintained at the interval between the battery cells, thereby maintaining the stability of the battery module even if the external vibration and impact were to occur.

In addition, in the spacer according to an embodiment, the absorbing capacity of the deformation due to the cell swelling may be significantly improved compared to other structures.

In addition, the spacer may press the battery cell so that the cell electrode plates in the battery module may have a uniform pressure distribution, accelerated deterioration or the rapid deterioration may be prevented, and thus, the lifespans of the cells in the module may be constantly maintained.

One or more embodiments may provide a battery module having an improved structure of a spacer, in which an initial interval between battery cells may be maintained, and initial pressing force may be given to maintain stability of the battery module if vibration or an impact occurs.

One or more embodiments may provide a battery module having an improved structure of a spacer, which may help minimize deformation of an outermost side of the battery module by offsetting deformation due to swelling in case of an end of life of the battery module and may help maintain lifespans of battery cells in the battery module as a uniform pressure may be applied to the battery cells.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of battery cells; and
spacers between adjacent ones of the plurality of battery cells, each spacer including:
a support frame, and
at least one pressing member coupled to the support frame, the at least one pressing member including a plate surface facing one of the battery cells and being in contact with an outside of a can of the one of the battery cells,
wherein the at least one pressing member includes a plurality of leaf springs,
wherein each leaf spring of the plurality of leaf springs includes:
a bump having a shape that is convex in one direction, and
a pair of extension parts respectively extending from opposite ends of the bump and coupled to the support frame,
wherein each leaf spring of the plurality of leaf springs is arranged such that a convex direction of one bump is opposite to a convex direction of a bump that is adjacent thereto in a widthwise direction of a long side of a battery cell of the plurality of battery cells,
wherein a width of each leaf spring of the plurality of leaf springs in the widthwise direction of the long side of the battery cell of the plurality of battery cells is about 7% to about 10% of a length of the long side of the battery cell of the plurality of battery cells.

2. The battery module as claimed in claim 1, wherein the support frame includes an insertion part extending inwardly from a long side corresponding to the widthwise direction of the long side of a battery cell of the plurality of battery cells and having an insertion groove into which the pair of extension parts are insertable.

3. The battery module as claimed in claim 2, wherein the insertion groove has a width that is greater than a thickness of the pair of extension parts.

4. The battery module as claimed in claim 1, wherein a height of each bump is about 7% to 10% of a length of a short side of the battery cell the plurality of battery cells.

5. The battery module as claimed in claim 1, wherein each leaf spring of the plurality of leaf springs is in a non-overlapping relationship in the convex direction with a leaf spring that is adjacent thereto in the widthwise direction of the long side of the battery cell of the plurality of battery cells.

6. A battery module, comprising:
a plurality of battery cells; and
spacers between adjacent ones of the plurality of battery cells, each spacer including:
a support frame, and
at least one pressing member coupled to the support frame, the at least one pressing member including a plate surface facing one of the battery cells and being in contact with an outside of a can of the one of the battery cells,
wherein the at least one pressing member includes a plurality of leaf springs,
wherein the plurality of leaf springs includes a pair of the leaf springs facing each other,
wherein the pair of leaf springs includes:
a first leaf spring including a first bump having a shape that is convex in one direction and a plurality of first extension parts respectively extending from opposite ends of the first bump and coupled to the support frame; and
a second leaf spring including a second bump having a shape that is convex in another direction and a plurality of second extension parts respectively extending from opposite ends of the second bump and coupled to the support frame,
wherein an interval between the first bump and the second bump is about 10% of a length of a short side of a battery cell of the plurality of battery cells, and
wherein the first leaf spring and the second leaf spring have different shapes and are disposed so that the plurality of first extension parts and the plurality of second extension parts are alternated with respect to each other in a widthwise direction of a long side of a battery cell of the plurality of battery cells, with the support frame therebetween.

7. The battery module as claimed in claim 6, wherein the first leaf spring and the second leaf spring are disposed so that a convex protruding direction of the first bump is opposite to a convex protruding direction of the second bump.

* * * * *